United States Patent [19]

Dabroski

[11] Patent Number: 4,513,059
[45] Date of Patent: Apr. 23, 1985

[54] RELEASE COATING COMPOSITION

[75] Inventor: Winifred C. Dabroski, East Brunswick, N.J.

[73] Assignee: Permacel, New Brunswick, N.J.

[21] Appl. No.: 564,762

[22] Filed: Dec. 21, 1983

Related U.S. Application Data

[63] Continuation of Ser. No. 345,127, Feb. 2, 1982, abandoned.

[51] Int. Cl.³ .............................................. C09J 7/02
[52] U.S. Cl. ..................................... 428/355; 428/40;
428/343; 428/352; 428/354; 427/208.8;
524/100; 524/512; 524/524; 524/528; 525/200
[58] Field of Search ............... 524/100, 512, 524, 528;
428/355, 40, 343, 352, 354; 427/208.8

[56] References Cited

U.S. PATENT DOCUMENTS

| | | | |
|---|---|---|---|
| 2,803,557 | 8/1957 | Martin et al. | 106/194 |
| 2,822,290 | 2/1958 | Webber | 117/68.5 |
| 2,880,862 | 4/1959 | Sermattei | 206/59 |
| 2,913,355 | 11/1959 | Collins | 117/68.5 |
| 2,914,167 | 11/1959 | Holtz | 206/59 |
| 3,102,103 | 8/1963 | Ahlbrecht et al. | 260/29.6 |
| 3,284,394 | 11/1966 | Suen et al. | 524/100 |
| 3,318,852 | 5/1967 | Dixon | 260/78.5 |
| 3,690,924 | 9/1972 | Estes | 117/68.5 |
| 3,773,538 | 11/1973 | Milutin et al. | 117/15 |
| 4,171,397 | 10/1979 | Morrow | 428/195 |

FOREIGN PATENT DOCUMENTS

| | | | |
|---|---|---|---|
| 225372 | 6/1958 | Australia . | |
| 697656 | 11/1964 | Canada | 525/200 |
| 1957329 | 5/1971 | Fed. Rep. of Germany | 428/355 |
| 425159 | 2/1935 | United Kingdom | 428/356 |
| 1010539 | 11/1965 | United Kingdom | 525/200 |
| 2064369 | 6/1981 | United Kingdom | 428/355 |

Primary Examiner—Joseph L. Schofer
Assistant Examiner—N. Sarofim
Attorney, Agent, or Firm—Dressler, Goldsmith, Shore, Sutker & Milnamow, Ltd.

[57] ABSTRACT

An aqueous release coating composition comprising a perfluorinated ester polymer and a film-forming polymer is described.

7 Claims, No Drawings

RELEASE COATING COMPOSITION

This application is a continuation of application Ser. No. 345,127, filed Feb. 2, 1982 abandoned.

Pressure-sensitive tapes with paper backing have found extensive use in the masking, labelling, and packaging fields. To be useful, the paper tapes should be easily unwound from the roll on which it is sold. Ready unwind is most frequently accomplished by applying to the tape backing on the back side, i.e., on the side opposite to that bearing the adhesive, a coating containing release agents. The release coating for the back side, often called "backsize", may be of a film-forming polymer which of itself has release properties as described in U.S. Pat. No. 2,607,711, or of a film-forming polymer which contains a release agent and obtained by applying a film-forming composition comprising a film-forming polymer (film-former) and a release agent in an organic solvent such as described in U.S. Pat. No. 3,502,497. However, for practical considerations, including economy, pollution control and the like, it is desirable to have a backsize composition applicable to paper backings from an aqueous dispersion. Although polytetrafluoroethylene films when used as backing per se as described in U.S. Pat. No. 2,824,026; U.S. Pat. No. Re. 241,953; U.S. Pat. No. 2,765,241 and Canada Pat. No. 657,508 release very easily from pressure-sensitive adhesive, the use of polytetrafluoroethylene as a release agent dispersed in a water-based film-forming composition and applied to paper backings has not provided a satisfactory backsize. Other fluorinated compounds such as described in U.S. Pat. Nos. 3,318,852; 3,690,924; 3,773,538; 4,171,397 and Australian Pat. No. 225,372 have not been entirely satisfactory. One water-based backsize described in U.S. Pat. No. 3,067,057, consisting of water-based film-forming polymers and a sulfated or sulfonated wetting agent as release agent, although somewhat successful in some systems, has drawbacks including fugitiveness of release agent and absorption of the release agent by the adhesive on aging. Thus, it is desirable to provide an effective water-dispersed backsize composition.

According to the present invention, it has been discovered that certain perfluorinated ester polymers in water dispersion may be combined with various water-based film-forming polymer compositions to produce a water-based release coating composition which is suitable as backsize for pressure-sensitive adhesive tapes, especially for those having a porous backing such as kraft paper backing.

The perfluorinated ester polymers are homopolymers and copolymers of ω-perfluoroalkyl-alkyl acrylate. By ω-perfluoroalkyl-alkyl is meant a structure which may be represented as

$$R_f-C_nH_{2n}-$$

wherein $R_f$ represents a perfluoroalkyl group. The perfluoroalkyl group may have from about 3 to 12 carbon atoms and the alkylene chain also may have from about 3 to 12 carbon atoms. When the polymers are copolymers, the comonomer may be a non-acrylate ester such as, for example, vinyl acetate. Suitable perfluorinated ester polymers have a fluorine content in the range of from about 30 to 50 percent. Polymer compositions are available commercially as aqueous dispersions which may contain polymerizable monomers and/or polymerizable or cross-linkable oligomers. The most suitable polymer compositions are available commercially as aqueous dispersions for use in treating fabrics to provide water-proofing and stain resistance. Two most useful commercially available water-dispersed perfluorinated ester polymer compositions are Scotchban ® FC-824 (40% solids) having a fluorine content of about 40% and available from 3M Company and Zonyl ® NWK (25% solids) having a fluorine content of about 38% and available from E. I. duPont Company. Suitable perfluorinated ester polymers include those described in U.S. Pat. No. 3,102,103.

Water-based film-forming polymer compositions which are suitable for preparing the release coating compositions includes melamine-formaldehyde composition, vinyl acetate latex, carboxylated vinyl acetate-ethylene terpolymer latex, water reducible alkyd, water reducible acrylic latex and the like. Most of the suitable film-forming polymer compositions are available commercially under various trade names. Thus, a suitable vinyl acetate latex may be obtained as National Starch 78-3730, from National Starch; carboxylated vinyl acetate ethylene terpolymer latex may be obtained as Airflex 416A, from Air Products; water-reducible alkyd may be obtainable as Doresco AKW5-1 from Dock Resins; water-reducible acrylic latex may be obtainable as Doresco ACW7-1 from Dock Resins.

The perfluorinated ester polymer composition release agent may be employed in the film-forming compositions in amounts of from about 0.5 to 3 percent (dry weight of release agent per dry weight of film-forming polymer) to obtain release coating compositions. The release coating composition also may include such materials as clay or silica to provide shingling or pigment to improve appearance or confer additional properties.

The tape backing contemplated for the use of the backsize release coating composition of the present invention is paper. Thus, the backing is quite porous in nature and normally will have been or will be saturated with latex or solvent based saturant to improve the internal properties of the paper. The treated paper then is coated on the backside with the release coating composition at a dry coating weight of from about 0.2 to 0.4 ounce per square yard and thereafter dried and fluxed at temperatures in the range of from about 250° to 350° F.

The opposite surface of the paper then is coated with any conventional pressure-sensitive adhesive. Representative adhesives may be rubber based adhesives, or may be acrylate based adhesives. Rubber based adhesives may be based on natural rubber, synthetic rubber such as styrene-butadiene rubber, A-B-A block copolymer rubber or other rubbers compounded with the appropriate tackifier for pressure-sensitive adhesives. Suitable representative pressure-sensitive adhesives are those which may be found in "Handbook of Adhesives" edited by Irving Skeist, Van Nostrand Reinhold Company, 1962, particularly in the chapter entitled "Pressure-Sensitive Tapes and Labels" by C. W. Bemmels, pages 724–735. Flat paper tapes normally are coated with adhesive at a rate of from about 1 to 1.5 ounces per square yard (dry weight) of adhesive and crepe paper tapes are normally coated at a somewhat heavier cost of the appropriate adhesive.

The following examples illustrate the invention but are not to be construed as limiting.

In all the examples, the release coating composition was applied to SBR (styrene-butadiene rubber) latex impregnated 28.5 pound crepe paper at a coating weight (dry) of approximately 0.25 ounce per square yard.

The properties described in the examples have the following meaning.

Unwind Adhesion. Force in ounces per inch of width required to unwind the tape at 150 feet per minute while drawing the end thereof radially away from a roll of the tape wound upon itself and mounted on a free-turning mandrel.

Quickstick. Measure of detackification determined by laying a strip of the tape on a horizontal surface and rolling a hollow plastic ball down an incline onto the tape. The vertical height from which the ball started is noted and the distance the ball rolls along the tape before coming to rest is measured. The quickstick is reported as the height in inches raised to the three-halves power, divided by the distance roll in inches. The ball made of nitrocellulose, of 1.5 inches in diameter and 1.916 grams in weight is cleaned with petroleum ether and dried before use.

Peel Adhesion. Force in ounces per inch width of tape required to remove pressure-sensitive adhesive tape from a panel carried out as described in the Pressure-Sensitive Tape Council test procedure PSTC-1.

EXAMPLE I

Release coating compositions of the following components were first prepared:

| | |
|---|---|
| Vinyl acetate-ethylene-acrylic acid terpolymer (Airflex ® 416A, 52% solids Air Products Co.) | 200 parts |
| Water | 150 parts |
| Perfluorinated ester polymer composition (Scotchban ® FC-824, 40% solids, 3M Co.) | 2-30 parts |

The amount of perfluorinated ester polymer represents from 0.8 percent to 12 percent (dry weight on dry weight) of the release coating composition.

The release coating compositions were coated on the latex impregnated crepe paper, dried at 250° F. and fluxed at 300° F.

The opposite side of the paper then was coated at a rate of 1.6 ounces per square yard (dry weight) with a crude rubber adhesive of the following composition:

| | |
|---|---|
| Milled natural rubber | 100 parts |
| Zinc oxide | 100 parts |
| Mixed olefin tackifier, softening point 95° C. (Wingtack ® 95 Goodyear Chem.) | 100 parts |
| Octylphenol-formaldehyde heat curing resin | 12 parts |
| 2,5-Ditertiary amylhydroquinone | 1 part |
| Zinc dibutyl dithiocarbamate | 2 parts |

The coated sheets were slit into tapes of 1 inch width, rolled and aged at ambient temperature (R.T.) and at 120° F. for 10 days. At the end of this period, the tapes were measured for unwind, adhesion and quickstick. The results with tapes coated with release coating compositions containing three different amounts of release agents are found in Table I.

TABLE I

| | IA | IB | IC |
|---|---|---|---|
| Composition | | | |
| Percent perfluorinated ester polymer | 0.8% | 5% | 12% |
| Properties (RT/120° F.) | | | |

TABLE I-continued

| | IA | IB | IC |
|---|---|---|---|
| Unwind adhesion | 14 oz/16 oz | 14 oz/16 oz | 14 oz/16 oz |
| Peel adhesion | 41 oz/41 oz | 41 oz/41 oz | 41 oz/45 oz |
| Quickstick | 6.4/6.4 | 6.5/6.5 | 6.4/6.4 |

EXAMPLE II

Release coating compositions of the following components were prepared:

| | |
|---|---|
| Vinyl acetate latex (National Starch 78-3730, 50% solids) | 200 parts |
| Water | 150 parts |
| Scotchban ® FC-824 | 2-30 parts |

The release coating compositions were used to coat impregnated paper then dried and fluxed as described in Example I and thereafter coated on the opposite side with a water based adhesive prepared in the following way:

Resin solution and premix solution of the following compositions were prepared:

| Resin Solution | |
|---|---|
| Wingtack ® 95 | 100 parts |
| Disproportionated rosin | 10 parts |
| Napthenic oil | 20 parts |
| Zinc dibutyl dithiocarbamate | 2 parts |
| Wingstay ® L (polymeric hindered phenol antioxidant, Goodyear) | 1 part |
| Toluene | 30 parts |
| Isopropyl alcohol | 10 parts |
| Premix Solution | |
| Water | 53 parts |
| Dimethyl ethyl amine | 13 parts |
| Natrosol ® 250H (hydroxyethyl cellulose, Hercules) | 0.5 parts |
| Zinc oxide | 2.0 parts |

To the resin solution first was added oleic acid then the premix solution was added slowly with rapid agitation whereupon the resin solution first became very viscous, then fluid and then underwent phase inversion with the resin becoming dispersed in the water phase.

The resin emulsion then was added with stirring to the following latex mixture:

| | |
|---|---|
| Carboxylated GRS resin (44% solids) | 76 parts |
| Natural rubber latex (63% solids) | 106 parts |

The solids composition of the resulting adhesive was as follows:

| | |
|---|---|
| Natural rubber | 66.7 parts |
| Carboxylateds GRS | 33.3 parts |
| Wingtack ® 95 | 100 parts |
| Disproportionated rosin | 10 parts |
| Napthenic oil | 20 parts |
| Zinc dibutyl dithiocarbamate | 2 parts |
| Wingstay ® L | 1 part |

The coated papers were slit into tapes and aged, and thereafter tested as described in Example I. The results are found in Table II.

TABLE II

|  | IIA | IIB | IIC |
|---|---|---|---|
| Composition |  |  |  |
| Percent perfluorinated ester polymer | 0.8% | 5% | 12% |
| Properties (RT/120 F) |  |  |  |
| Unwind adhesion | 13 oz/17 oz | 13 oz/16.5 oz | 13 oz/16 oz |
| Peel adhesion | 40 oz/40 oz | 40 oz/40 oz | 40 oz/40 oz |
| Quickstick | 5.9/6.1 | 5.9/6.1 | 5.8/6.1 |

EXAMPLE III

The following release coating compositions were prepared:

|  | IIIA | IIIB | IIIC |
|---|---|---|---|
|  | (parts by weight) | | |
| Water reducible alkyd resin (Doresco AKW5-1, 70% solids, Dock Resins) | 200 | 200 | 200 |
| Dimethylethanolamine | 14 | 14 | 14 |
| Water | 205 | 205 | 205 |
| Hexamethoxymethylmelamine resin (Cymel ® 303, 98% solids, American Cyanamid) | 60 | 60 | 60 |
| Scotchban ® FC 824 | 2* | 2* | 2* |
| Aerosil ® | — | 0.5 | — |
| Colloidal silica | — | — | 2 |

*Represents 0.4 percent by weight based on dry weight of film forming polymer.

The release coating compositions were applied as previously described, then dried and cured for 1 minute at 350° F.

Thereafter, the opposite surface was coated with 1.6 ounces per square yard (dry weight) of the water-based adhesive of Example II. The coated papers were slit into tapes, aged and tested as previously described. The results are seen in Table III.

TABLE III

| Composition | IIIA | IIIB | IIIC |
|---|---|---|---|
| Unwind Adhesion | 14 oz/18 oz | 15 oz/20 oz | 16 oz/20 oz |
| Peel adhesion | 35 oz/36 oz | 50 oz/50 oz | 43 oz/43 oz |
| Quickstick | 5.7/6.7 | 10/10 | 8.0/7.5 |

EXAMPLE IV

In a similar manner the following release coating compositions were prepared:

|  | IVA | IVB | IVC |
|---|---|---|---|
| Airflex ® 416A | 200 | 200 | 200 |
| Water | 200 | 200 | 200 |
| Scotchban ® 824 | 2[1] | — | — |
| Zonyl ® NWK (25% solids, du Pont) | — | 2[2] | — |
| Zonyl ® NWK | — | — | 6[3] |

[1] 0.77 percent
[2] 0.96 percent
[3] 1.34 percent

The release coating compositions were coated at a coating weight of about 0.25 ounce per square yard on standard crepe paper, the coated papers were dried at 200°–250° F. and then fluxed at 300° F. The opposite face of the sheets were then coated with 1.5 ounces per square yard (dry weight) of an A-B-A block copolymer adhesive of the following composition:

| Styrene-isoprene-styrene block copolymer (Kraton ® 107 Shell Chemical Co.) | 100 parts |
|---|---|
| Wingtack ® 95 | 80 parts |
| Zinc dibutyl dithiocarbamate | 1 part |
| 2,5-Ditertiary amylhydroquinone | 0.5 parts |
| Solids in toluene | 50 percent | as more fully described in Example II of U.S. Pat. No. 3,676,202, thereafter the sheets were slit, aged and tested as previously described. The results are seen in Table IV.

TABLE IV

| Composition | IVA | IVB | IVC |
|---|---|---|---|
| Unwind adhesion | 8 oz/15 oz | 8 oz/22 oz | 10 oz/23 oz |
| Peel adhesion | 30 oz/32 oz | 25 oz/22 oz | 26 oz/25 oz |
| Tack | 8.0/7.5 | 5.0/4. | 5.0/4.7 |

EXAMPLE V

An operation was carried out in a manner similar to that described in Example IV except that the milled crepe rubber adhesive of Example I was employed instead of the adhesive based on the block copolymer. The compositions are designated as VA, VB and VC in which VA employs Scotchban ® 824 as the perfluorinated ester polymer, VB employed Zonyl ® NWK at 2 parts and VC employed Zonyl ® NWK at 6 parts. The results are seen in Table V.

TABLE V

| Composition | VA | VB | VC |
|---|---|---|---|
| Unwind adhesion | 5 oz/10 oz | 5 oz/22 oz | 8 oz/15 oz |
| Peel adhesion | 30 oz/27 oz | 25 oz/24 oz | 25 oz/26 oz |
| Tack | 7.1/6.7 | 4.0/4.0 | 5.0/4.0 |

Scotchban ® FC-824 is believed to be a copolymer of a perfluoroalkyl-alkyl acrylate and vinyl acetate containing about 40 percent fluorine.

Zonyl ® NWK is believed to be a homopolymer of a perfluoroalkyl-alkyl acrylate containing about 38 percent fluorine.

I claim:

1. A method for the production of pressure sensitive adhesive paper tape comprising the steps of:
   (a) mixing in aqueous solution a water-based film-forming polymer and a perfluorinated ester polymer, thereby forming a water-based backsize release coating composition, said composition comprising an aqueous mixture of
      (i) a water-based film-forming polymer and
      (ii) a perfluorinated ester polymer containing from about 30 to about 50 percent fluorine, said perfluorinated ester polymer being present in an amount of from about 0.5 to about 3.0 percent, dry weight of perfluorinated ester polymer per dry weight of water-based film-forming polymer;
   (b) impregnating a paper tape backing with a solvent-based or latex-based saturant to improve internal properties of the backing;
   (c) coating the backing on the backside surface with the release coating composition;
   (d) drying and fluxing the coated backing at a temperature of from about 250° to 300° F.; and (e) coating the backing on the side surface opposite to the backside with a pressure sensitive adhesive.

2. The method of claim 1 further comprising the step of adding a filler to the release coating composition prior to step (b) thereby providing shingling of the tape.

3. The method of claim 2 wherein the filler is clay or silica.

4. The method of claim 1 further comprising coating the backside with the release coating composition to provide a dry coating weight of from about 0.2 to about 0.4 ounce per square yard.

5. A pressure-sensitive adhesive tape comprising a paper backing having two surfaces, said paper being impregnated with an internal property improving latex or solvent-based saturant and having a coating on the backside surface of a release coating composition and a coating on the opposite surface of a pressure-sensitive adhesive, said release coating composition comprising an aqueous mixture of (a) a water-based film-forming polymer and (b) a perfluorinated ester polymer containing from about 30 to about 50 percent fluorine, said perfluorinated ester polymer being present in an amount of from about 0.5 to about 3.0 percent, dry weight of perfluorinated ester polymer per dry weight of water-based film-forming polymer, said coating composition being coated and then dried and fluxed at a temperature of about 250° to about 300° F.

6. The pressure-sensitive adhesive tape according to claim 5 wherein said water-based film-forming polymer is selected from the group consisting of a melamine-formaldehyde composition, a vinyl acetate latex, a carboxylated vinyl acetate-ethylene terpolymer latex, a water reducible alkyd, a water reducible acrylic latex and mixtures thereof.

7. The pressure-sensitive adhesive tape according to claim 5 wherein said perfluorinated ester polymer is a perfluorinated acrylate polymer.

* * * * *